(12) United States Patent
Mandl et al.

(10) Patent No.: US 6,571,133 B1
(45) Date of Patent: May 27, 2003

(54) METHOD FOR PROCESS MONITORING, CONTROL, AND ADJUSTMENT

(75) Inventors: Roland Mandl, Ortenburg (DE); Johann Nommer, Tann (DE); Erich Fuchs, Salzweg (DE); Bernhard Sick, Passau (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 0 days.

(21) Appl. No.: 09/446,685

(22) PCT Filed: Jun. 22, 1998

(86) PCT No.: PCT/DE98/01710

§ 371 (c)(1),
(2), (4) Date: Feb. 9, 2000

(87) PCT Pub. No.: WO98/59281

PCT Pub. Date: Dec. 30, 1998

(30) Foreign Application Priority Data

Jun. 23, 1997 (DE) .......................................... 197 26 544
Apr. 11, 1998 (DE) .......................................... 198 16 273

(51) Int. Cl.⁷ ............................................... G05B 11/01
(52) U.S. Cl. ........................... 700/18; 700/17; 700/11; 700/83; 345/967
(58) Field of Search ............................ 700/18, 17, 83, 700/11; 345/965, 966, 967

(56) References Cited

U.S. PATENT DOCUMENTS

| 5,392,207 A | | 2/1995 | Wilson et al. ......... 364/167.01 |
|---|---|---|---|
| 5,452,201 A | * | 9/1995 | Pieronek et al. ............. 364/188 |
| 5,530,643 A | * | 6/1996 | Hodorowski ................. 364/191 |
| 5,596,696 A | * | 1/1997 | Tindell et al. ............... 395/806 |
| 5,596,704 A | * | 1/1997 | Geddes et al. ............... 395/326 |
| 5,623,592 A | * | 4/1997 | Carlson et al. .............. 395/348 |
| 6,173,208 B1 | * | 1/2001 | Park et al. ..................... 700/83 |

FOREIGN PATENT DOCUMENTS

| DE | 42 11 678 A | 10/1993 |
|---|---|---|
| EP | 0 372 725 B | 11/1996 |
| WO | WO 97 03389 A | 1/1997 |
| WO | WO 97 27540 A | 7/1997 |

OTHER PUBLICATIONS

Dellen C et al: "Automated Code Generation From Graphical, Reusable Templates", Proceedings Of The Digital Avionics Systems Conference, Institute Of Electrical And Electronics Engineers, Oct. 14–17, 1991, pp. 299–304, NR. Conf. 10, Los Angeles, XP000309258.

* cited by examiner

*Primary Examiner*—Paul P. Gordon
(74) *Attorney, Agent, or Firm*—Alston & Bird LLP

(57) ABSTRACT

A method, in particular for monitoring, controlling and adjusting a process, wherein a signal processing instruction is synthesized on a computer-assisted user interface by arranging and connecting icons (6, 7), and generated by the computer from base modules containing individual instructions, one base module being allocated to each icon (6, 7), and the individual instructions of the selected base modules being linked to one another according to the graphic integration of the symbols (6, 7) for transmitting and/or processing data.

15 Claims, 3 Drawing Sheets

METHOD FOR PROCESS MONITORING, CONTROL, AND ADJUSTMENT

BACKGROUND OF THE INVENTION

The invention relates to a method, in particular for monitoring, controlling, and adjusting a process, wherein a signal processing instruction is synthesized on a computer-assisted user interface by arranging and connecting icons and produced by the computer from base modules containing individual instructions.

Such process monitoring, control, and adjustment systems (PSR) produce from digital data a signal processing instruction, which acts with respect to input and output signals in the same manner as a corresponding hardware structure comprising, for example, digital filters, PID controllers, control cards. Moreover, the signal processing instructions may also be used for simulating a control system or for quality assurance. To keep the programming times of PSR systems low, graphic user interfaces are used as substitutes for the programming environment. In the mathematical sense, the representation is a graph structure, which is built up on the user interface from individual, for example, digital filter icons and PID controller icons. According to this graph structure on the computer, a signal processing instruction is composed from individual instructions. In most cases, these individual instructions are programmed in base modules, with the individual base modules containing certain computing operations with algorithms. The graph structure or the signal processing instruction is finally translated to a useful execution sequence.

A disadvantage of these known PSR systems lies in that the synthesis of the signal processing instruction from the individual instructions is complicated, and that in the further development of the base module groups, problems will arise with the combination of the base modules, since in the event that the entire system is supplemented with further individual instructions, the entire program package with the composite signal instruction will have to be constantly retranslated because of the changing interface. In principle, an addition of a basically new functionality is not possible for that user, who does not possess the source code of the signal processing instruction. The expandability of such PSR systems is limited to functionalities, which were previously provided in the programming of the PSR system.

It is the object of the present invention to further develop a method of the initially described kind such that it simplifies expandability and facilitates the setup of libraries with frequently used base modules.

SUMMARY OF THE INVENTION

The above and other objects and advantages of the present invention are achieved by the provision of a method of the described type wherein a signal processing instruction is synthesized on a computer assisted user interface by arranging and connecting icons, and generated by the computer from base modules containing individual instructions, with one base module being allocated to each icon. The individual instructions of the selected base modules are linked to one another according to the graphic integration of the icons for transmitting and/or processing data.

The allocation of one base module each to a possible icon that can be placed on the user interface, in particular with an exactly predetermined interface, which also permits transferring diverse parameters for adapting the individual instructions, facilitates the reuse of the base modules and a fast development of methods for monitoring, controlling, and adjusting a process. Since it is possible to assign to each individual icon exactly one base module, the icons may be put in program libraries and requested via the user interface, so that it is possible to synthesize in any desired way the signal processing instruction from the individual instructions contained in the base modules. This kind of encapsulated modeling may advantageously be assisted by object-oriented program languages. It is a special advantage that the base modules can be simply linked with their interfaces in accordance with the integration of the icons on the user interface.

In an advantageous further development of the method according to the invention, the input data, in particular from sensors, are processed by the formed signal processing instruction for generating output signals and the thereby developing data flow is controlled by a sequential control. The integration of the icons in the signal processing instruction is depicted on the user interface, for example, as a connection line between an output of a last icon and the input of the following icon. Preferably, this connection line corresponds to an interface between two base modules. The data flow, which is transmitted via such connection lines or interfaces is normally derived from the basic data types of the underlying program language. For example, individual values, matrices, records, or special data fields of these types of basic data are transmitted. Advantageously, the sequential control makes it also possible to assist in the processing of complex data types of any desired structure. A data transmission between the base modules is started by the sequential control. It is the task of the participating base modules to determine the kind of transmission as well as the check for allowability (type checking) of a connection.

Preferably, the data flow is processed by the signal processing instruction in the form of individual data packets associated to individual base modules, the size of the packets being freely determinable, and the sequential control determines the computing readiness of the base modules. For reasons of efficiency, the data are transmitted in the signal processing instruction in blocks. Several blocks together form a data packet. Besides the relevant transmission data, each packet receives further data, in particular packet name, packet status, range of values, physical unit, scaling factor, scanning rate. The packet status informs about the association of data blocks to an icon or base module. Since an icon corresponds to an electronic component, the packet status thus determines likewise the association of the data block to the simulated component, for example, as input data for a PID controller. With the aid of additional data to the scanning rate within the data packet, it is possible to identify and handle different scanning rates of data packets. The processing of signals of different scanning rates is assisted by the sequential control in that at times, when no further processing module is ready to compute, the list of source modules will be polled, until one or more ready-to-compute source modules are found. Depending on the used scanning rate of the source modules, this will be the case at different times. All successors of the ready-to-compute source modules will be handled in the next processing cycle, etc. (data flow principle). The sequential control regulates the processing of individual instructions of the base modules or the processing of the data of a base module in a suitable sequence. In particular, it is necessary to process each base module together with its data several times, so that no data jam occurs at the input of a base module. Preferably, the sequential control generates no static processing sequence, which would depend only on the structure of the graph, so that a particularly efficient data processing is made possible in the case of cycles, multiprocessing of individual instructions, and asymmetrically distributed quantities of data in the signal processing instruction.

In a particularly preferred further development of the invention, the sequential control determines the computing readiness on a base module at each change of the input data. In this connection, the presence of all input data needed on the base module is preferred, and a processing priority allocated to the base module is queried for purposes of releasing the processing of data packets by the individual instruction corresponding to the base module. In this process, the dynamic method described in the following is used, which is in a position to handle cycles. A base module signals its computing readiness to the sequential control, when it is in a position to carry out its individual instruction. In this connection a difference is made between two kinds of modules: processing modules can change to the ready-to-compute state only, when the quantity of data at the inputs changes, whereas source modules can be ready to compute even without a change in input data, provided inputs are available at all. Directly after processing, a base module is always in the not-ready-to compute state.

This method will be especially advantageous, when the signal-flow graph contains a plurality of source modules, which supply different quantities of data at different times or at different scanning rates. This applies primarily to multi-sensor arrangements, which measure different quantities at the same time. The identification of the computing readiness permits a synchronization of the generated data flows at a different scanning rate without generating disproportionately large amounts of data as a result of overscanning slower operations. As a result of processing the data packets of a base module during the computing readiness, it is also possible to process in an advantageous and efficient manner measured quantities that chronologically arrive one after the other. The identification of the computing readiness, in particular by the base modules themselves, is an important instrument for synchronization and cycle handling and one of the prerequisites for the expandability of the program library. However, the identification of computing readiness is also one of the important prerequisites for handling cycles in signal-flow graphs. A feedback (cycle) in the signal-flow graph causes modules, which were ready to compute once before in the corresponding processing cycle, to return to this state. As a result of identifying the status of the start data packet at one of the inputs, it is possible to interrupt the (otherwise endless) cycle. In this instance, the "feedback module" signals no longer ready to compute, and the processing operation continues with the modules remaining in the queue.

Starting with source modules, it is preferred to test those base modules for computing readiness, whose input data change in particular by executing an individual instruction of a preceding base module. In so doing, all source modules are first tested for computing readiness. Ready-to-compute source modules are processed, and all further base modules, in which this operation would result in a change of the input data, namely all direct successors are tested themselves for computing readiness and processed, if need be. In the following step, their successors are again tested for computing readiness, etc. This operation continues, until ready-to-compute base modules are no longer available. When ready-to-compute base modules are no longer present, the individual instructions of the source modules are again executed. This method ensures that all ready-to-compute processing modules are processed, since a change in the input data and, thus, a change of state can be released only by processing an immediate predecessor. On the other hand, base modules are tested for computing readiness only, when there is a high probability for a change of state, which constitutes the efficiency of the method.

Preferably, the data flow between the linked base modules, in particular in the case of several, ready-to-compute base modules, is controlled by assigning priorities. Thus, in the case of several, simultaneously ready-to-compute modules, it is easy to control the selection by the assigned priority.

In another further development of the method, a synchronization of data packets arriving at different times at the obligatory inputs of a base module occurs by means of a data packet status, in particular at different scanning rates. The synchronization is necessary, since data arriving deferred in time must be linked via the individual instructions of the base modules to a temporally clear overall statement, which is then again forwarded as an output signal to the next base module. However, advantageously synchronization makes it also possible to provide in different branches of the signal processing instruction different processing times or a time-deferred acquisition at measuring stations. The signal processing instruction, in particular the base modules, contain elements for evaluating synchronization, which evaluate information about the component association in the data packets.

For synchronizing and cycle handling data flows from asynchronous data sources the packet status is used. If a base module computes on several data blocks, it will be ensured that each obligatory input of the base module, to which data must be applied synchronously, processes data blocks with the same packet status. If no data have yet arrived at an input, it will not be possible to find a computing readiness. With that, the sequential position delays processing to the next call of the base module, until the input data are completely available, to be then able to start processing. This synchronization by awaiting still missing data blocks is advantageously assisted in that the sequential control generates a call in the case of each arriving data packet.

Many individual instructions change the data representation. Thus, for example, a polynomial regression generates a set of polynomial coefficients from two vectors with x and y values. As a result of using packet start or packet end signals and further information concerning the data packets, status information in output data of a base module is able to propagate the status information of its underlying input data irrespective of the length of output data. Thus, a data packet from several blocks at the input of a base module is able to generate a data packet consisting of only one complete block at the output. Special algorithms for processing data packets are able to gather data, until the packet end information is reached. Upon arrival of packet start information, it is possible to perform necessary initializations; thereby enabling a correct and run-time-independent handling of cycles in the signal flow graph.

As a result of synchronizing the data, the following advantages are obtained. It is possible to process data, which arrive at possibly not exactly predictable times at the input of a base module. It is possible to correct path or processing time differences in the different branches of the signal processing instruction. It is possible to avoid processing of large amounts of data, which generate a dead time in irrelevant regions between components.

Preferably, the input data, base module parameters, or output data of the signal processing instruction may be graphically shown on the user interface. In an advantageous manner for the user, this permits displaying on the user interface data changes, in particular changes in controlled variables.

However, according to the invention, this object is also accomplished when the signal processing instruction is composed from the individual base modules, with additional data associated to the base modules which are linked being checked to see whether a connection of two adjacent base modules is acceptable. As a result, while arranging the icons as the graph is plotted, a check is made between an output of a predecessor module and an input of a target module while connecting two icons in a linkage procedure to see whether a connection of both icons and, thus, of the associated base modules is allowed. In this process, it is preferred to check the consistency of a predetermined type of transmitting data with the type of receiving data that is desired at the input of the base module. One may provide that the validation does not lead to a limitation of data types. For example, it is possible to indicate only a warning, while the connection is still possible. This will be of advantage, just when it is intended to use a different kind of information exchange or new, more complex data types within the scope of a further development of groups of base modules. Thus, such complete data types are advantageously validated not in the processing of the signal processing instruction while transmitting data, but in the preparation of the signal processing instruction. During the composition of the signal processing instruction, the early validation permits detecting therein easily avoidable errors, before data processing proceeds. In this process, the expansion of the algorithm library consisting of many, optionally usable base modules, is not limited by a restriction of the data types that can be handled by the user interface.

In a particularly preferred further development of the method according to the invention, an additional validation occurs while executing the individual instruction of a base module, in particular by checking the allowability of the data type, the units, or the scanning rates of the informational data. This leads to a multistep validation of complex data types between the base modules by the base modules themselves, which check and evaluate the additional information upon receipt of data. As a result of the division into a validation during the composition of the signal processing instruction, and the validation while processing the data, the user interface will initially need no knowledge of the data types that are possibly used in a further development in the future. Consequently, complex data types, i.e., composite data types can be freely defined. With that, it is possible to adapt the system to new requirements at any time.

It is preferred to validate the allowability of the connection of two base modules in a directional manner. In this process, the allowability of the connection is checked from the preceding to the following base modules, and vice versa. The validation occurs in two directions already when the graphs are prepared on the user interface. With that, it is possible to check a list of possible, compatible types from both sides. If the source or target module is compatible with several data types, it will thus be able to accept the desired type and to propagate it to further inputs and outputs. For example, after a single input or output connection, it is possible to establish in a multiplexer the further data types that are to be expected respectively at the other inputs and outputs.

It is also preferred to check the allowability of the information exchange, in particular by means of common storage areas or data. Preferably, the participating base modules control the validation of the kind of communication among themselves. In this manner, it is possible to change the communication at any time to maximum speed or maximum programming comfort. Based on the hierarchic data structure (data blocks and data packets as a combination of several blocks) and the additional information (scanning rates, units, value ranges) communicated along with the data, it is possible to perform logic validations while processing the graph, for example, by adding identical scanning rates or units. Thus, for example, it is detected during the processing, when measuring data that advance successively through several measuring points, are absent at one of the measuring points. The error may occur, for example, because the connection to one of the measuring points is interrupted.

However, with the aid of the hierarchic data structure and additional information, it is also possible to detect logic errors in the design phase of the signal-flow graph, for example, when it is attempted to add measured data that were received at different scanning rates, or possess different physical units. Advantageously, a greatest possible expandability of the system is realized by the combination of the early validation.

A connection between the base modules, namely an edge of the signal-flow graph, may also be represented by a network connection. With that, it is possible to realize a decentralized data acquisition/evaluation, which is likewise assisted by the sequential control (pure data flow control).

It is also possible to operate several instances of a sequential control and, thus, several signal-flow graphs parallel (time slice, preemptive multitasking). The communication is data-flow oriented. Furthermore, hierarchization of signal-flow graphs (macro formation) is assisted by the sequential control.

In the case of an unacceptable linkage of base modules or in the case of data with unacceptable data formats, it is preferred to generate an error message, in particular by the participating base modules or the user interface.

BRIEF DESCRIPTION OF THE DRAWINGS

Additional advantageous further developments of the invention are defined in the following, with three embodiments of the invention being described with reference to the attached drawings, in which.

DETAILED DESCRIPTION OF THE PREFERRED EMBODIMENTS

Figure 1:
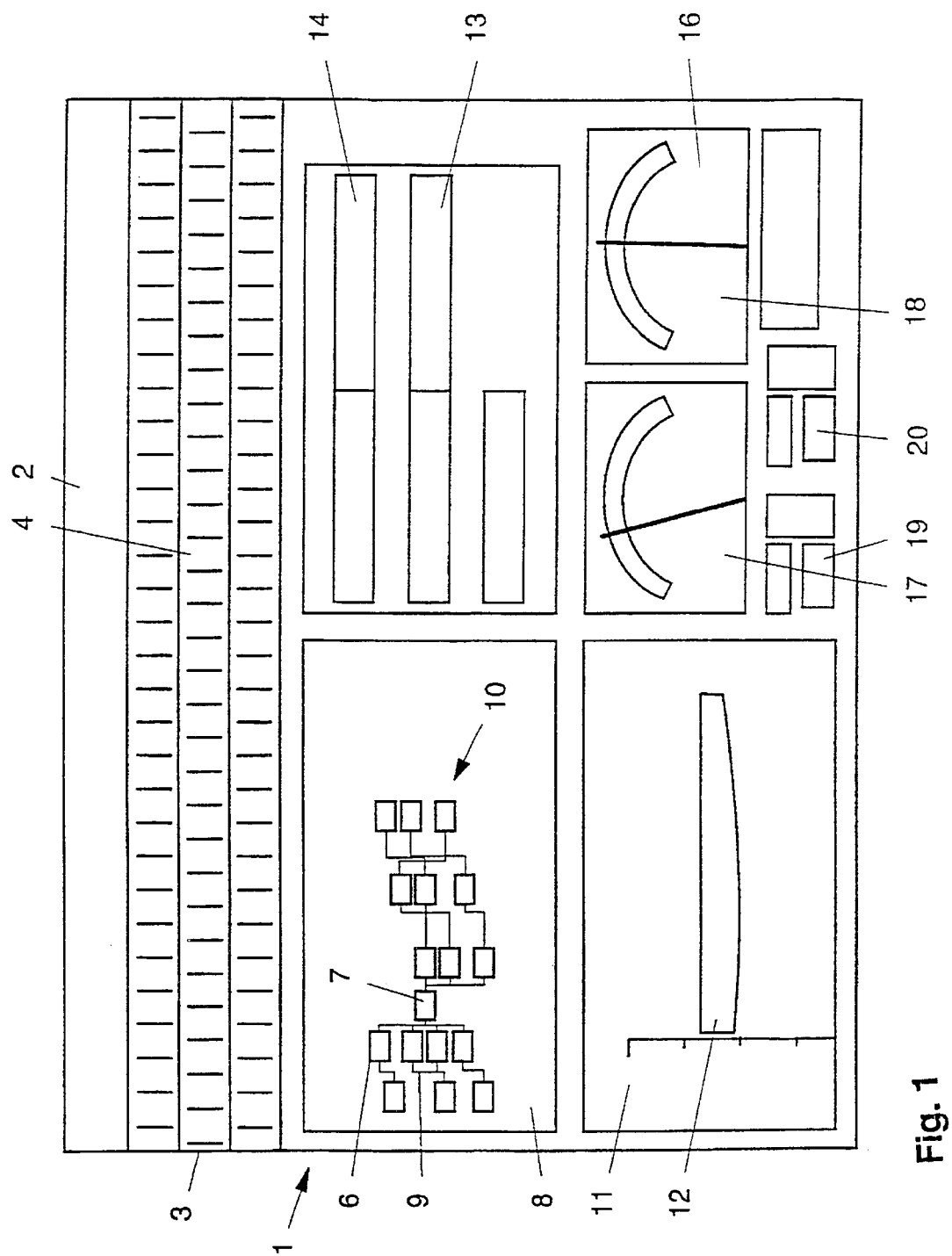
FIG. 1 is a front view of a computer screen with a computer-protected user interface while carrying out the method of the present invention.

FIG. 1 illustrates a user interface 2 shown on a computer screen 1 with a command line 3 with individual icon selection fields 4 arranged on the upper side. When actuating one of the icon selection fields 4, icons 6 and 7 appear each on the user interface 2. They are arranged, for example, by means of computer accessories, such as a mouse, in an area 8 provided therefor on the user interface 2. Each of the icons 6 and 7 respectively stands for a certain base module, which imitates or simulates typical components for monitoring, controlling, and adjusting a process.

In this connection, it is possible to select, for example, the following icons, namely: loading data from a data bank, random generator, function generator for sine, triangular, saw-tooth, square, and pulse signals, loading a text file, control signals with adjustable pulse/pause ratio, constant value adjuster, operating element for analogous value input, input of integral values (control signal for multiplexer), modules for statistic processing, such as standard deviation, mean value, sorting module with control outputs, reducing the scanning rate of the signal, fast and discrete Fourier transform, digital IIR filter, filters, such as low-pass, high-pass, band pass, Bessel, Chebyshev, and Butterworth filters, trigger circuits, statistical filters for smoothing functional courses, modules for converting parallel applied parameter values in a serial data flow, serialization of several scalar and vectorial data in a serial data flow, error module, logic gates, such as AND-, OR-elements, flip-flops, monoflops, binary encoders, scalar modules, modules for generating arithmetical basic functions, communication modules for transmitting measured data, drivers for signal processor cards, I/O units and multiplexers for decimal or binary signals; fuzzy logic, and pattern detection modules. Naturally, this list is only exemplary and may be extended as desired. The scope of protection of the invention is not limited to these examples.

The icons 6 and 7 are each arranged in the area 8 in a certain position and interconnected by a connecting line 9. Such connecting lines 9 can also be used to generate feedback loops. Thus, by selecting, connecting, and repeating the processes, a signal processing instruction is generated, which is illustrated as a signal-flow graph 10.

A further area 11 of the user interface 2 shows a thickness profile 12 of a capacitive strip thickness measurement of metal foils. A further area 13 of the user interface 2 shows measured results, such a strip width, thickness of the exemplary profile, etc. in the form of a digital display 14.

In an area 16 of the user interface 2, analogous displays 17 and 18 make each visible two controlled variables for a statistical control of the process. Two input fields 19 and 20 serve to input the desired value of the thickness and to select the measuring module.

Figure 2:
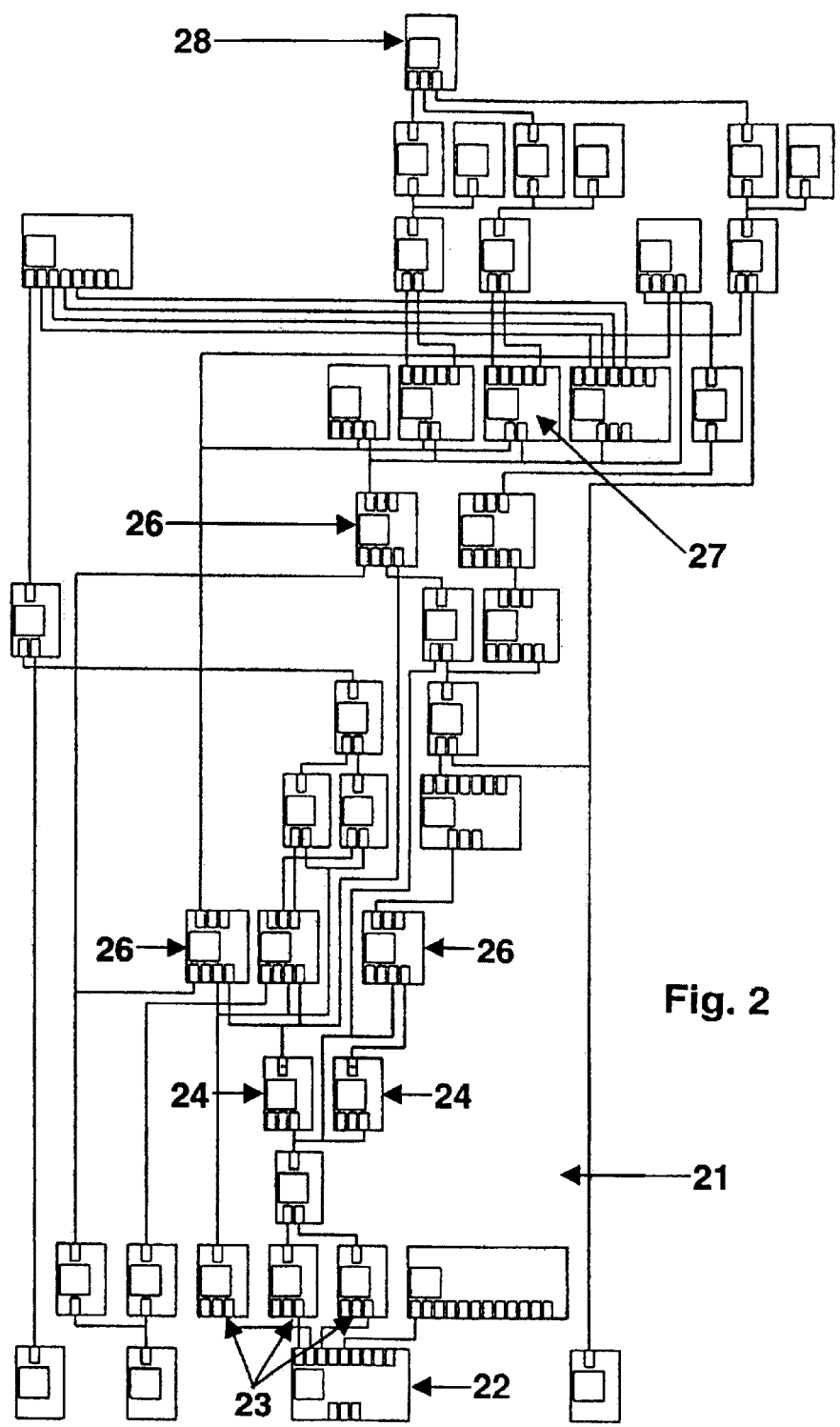
FIG. 2 is a schematic view of a signal processing instruction of a second embodiment.

A signal-flow graph 21 of the signal processing instruction, which is built up from icons and shown in FIG. 2, is used in measuring tasks for visualizing the process and control. Among other things, the signal-flow graph 21 comprises a module 22 for acquiring data, a plurality of scalar modules 23, which scale the measuring signals, trigger modules 24, modules 26, which separate partial data sets from data packets, and regression analysis modules 27. Subsequent modules thereof numerically compute characteristic values, such a wedge or hollow shape of the thickness profile. For controlling the process, output module 28 supplies these characteristic values to a production machine.

Figure 3:
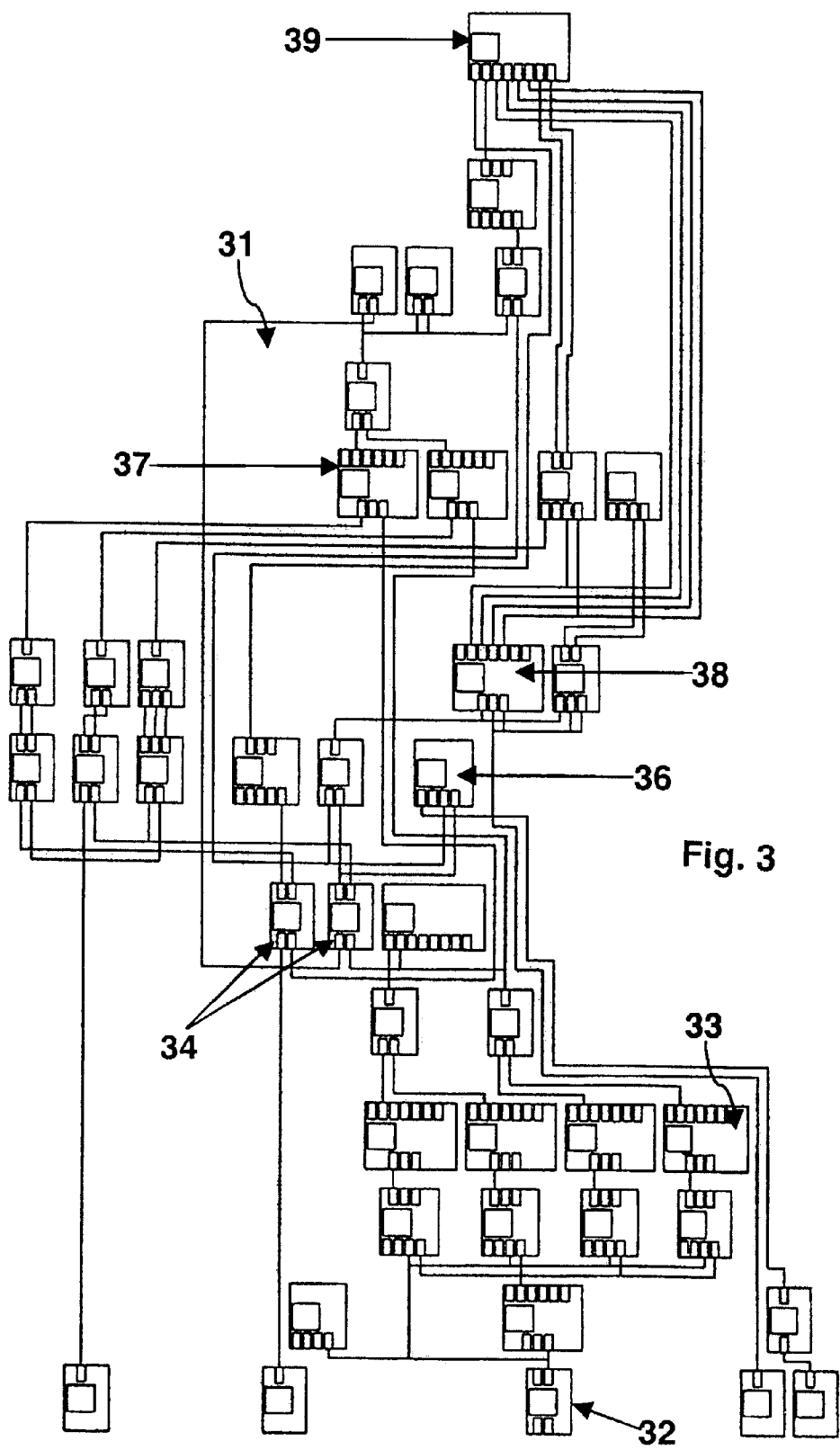
FIG. 3 is a schematic view of a signal processing instruction of a third embodiment for measuring the stem depth on valves of an antiblocking system.

In the signal-flow graph 31, which is used for measuring the stem depth on valves of an antiblocking system and shown in FIG. 3, piece goods are measured in the place of an endless strip material. A gasket, whose stable and accurate press fit is to be monitored by an optical triangulation measurement, is pressed into a valve housing not shown. During a simulation by signal-flow graph 31, measured values are read out from a file by a read-in module 32. Four regions in different places of the valve housing are used for the quality control. A group of modules 33 forms two differences therefrom, and respectively computes and shows the desired stem depth. It is realized by the multiplex modules 34 in signal-flow graph 31 that the data of a principal measurement can be processed likewise in another subgraph. Besides storing and archiving the measured data by a group of modules 36, a sorting for acceptance/rejection also occurs in a group of modules 37. A group of modules 38 prepares a process statistic of one production shift. An output module 39 provides the sorting result in the form of digital output data.

What is claimed is:

1. A method for monitoring, controlling and adjusting a process, wherein a signal processing instruction is synthesized on a computer-assisted user interface by arranging and connecting icons, and generated by the computer from base modules containing individual instructions, one base module being allocated to each icon, and the individual instructions of selected base modules being linked to one another according to a graphic integration of the icons for transmitting and/or processing data, wherein input data from sensors are processed by the formed signal processing instruction for generating output signals, and the thereby developing data flow is controlled by a dynamic sequential control.

2. Method of claim 1, wherein the input data from sensors, are processed by the formed signal processing instruction for generating output signals, and where the thereby developing data flow is controlled by a sequential control.

3. Method of claim 2, wherein in the case of an absent computing readiness of all base modules, processing of the input data continues respectively at source modules.

4. Method of claim 1, wherein the data flow is processed by the signal processing instruction in the form of data packets associated to the individual base modules, whose packet size is freely determinable, and where the sequential control determines computing readiness of the base modules.

5. Method of claim 4, wherein at each change in the input data on a base module, the sequential control determines the computing readiness thereof, wherein it queries the presence of all required input data on the base module and a processing priority associated to the base module for purposes of releasing the processing of data packets by the individual instruction corresponding to the base module.

6. Method of claim 4, wherein proceeding from source modules, those base modules are tested for computing readiness, whose input data change by executing an individual instruction of a preceding base module.

7. Method of claim 1, wherein between the linked base modules, in the case of several ready-to-compute base modules, the data flow is controlled by assigning priorities.

8. Method of claim 1, wherein by means of a data packet status, a synchronization of data packets occurs, which arrive at different times at obligatory inputs of a base module at different scanning rates.

9. Method of claim 1, wherein the input data, base module parameters, or output data of the signal processing instruction are graphically illustrated on the user interface.

10. Method for monitoring, controlling, and adjusting a process of claim 2, wherein a signal processing instruction is composed from base modules, wherein individual base modules are interconnected via interfaces for purposes of transmitting informational data, and wherein the data are processed in the base modules of the signal processing instruction, wherein when the signal processing instruction is composed from the individual base modules, it is validated with reference to additional information associated to the base modules that are to be linked, whether a connection of two adjacent base modules is allowable.

11. Method of claim 10, wherein an additional validation occurs while executing an individual instruction of a base module, by checking allowability of data type, units, or scanning rates of informational data.

12. Method of claim 10, wherein the validation of allowability of the connection of two base pg,19 modules occurs directionally, the allowability of the connection being checked from the preceding to the following base module, and vice versa.

13. Method of claim 10, wherein during the validation, allowability of an information exchange is also checked, via common storage areas or files.

14. Method of claim 10, wherein during the validation, when the signal processing instruction is composed, a use of complex data types is not restricted.

15. Method of claim 10, wherein the case of an unacceptable linkage of base modules, or in the case of data with unacceptable data formats, an error signal is generated by the participating base modules.

* * * * *